(12) United States Patent
Bischof et al.

(10) Patent No.: US 10,625,104 B2
(45) Date of Patent: Apr. 21, 2020

(54) IMPREGNATED FILTER MATERIAL (71) Applicant: Dr. P. Pleisch AG, Bäretswil ZH (CH)

(72) Inventors: Rolf Bischof, Hittnau (CH); Frédéric Venetz, Wernetschausen (CH)

(73) Assignee: Dr. P. Pleisch AG, Baretswil ZH (CH)

( * ) Notice: Subject to any disclaimer, the term of this patent is extended or adjusted under 35 U.S.C. 154(b) by 458 days.

(21) Appl. No.: 15/363,006

(22) Filed: Nov. 29, 2016

(65) Prior Publication Data
US 2017/0173372 A1 Jun. 22, 2017

(30) Foreign Application Priority Data
Nov. 30, 2015 (CH) .................... 01748/15

(51) Int. Cl.
| A62B 23/02 | (2006.01) |
| B01J 20/20 | (2006.01) |
| B01J 20/32 | (2006.01) |
| B01D 39/02 | (2006.01) |
| B01D 39/20 | (2006.01) |

(52) U.S. Cl.
CPC .............. *A62B 23/02* (2013.01); *B01D 39/02* (2013.01); *B01D 39/2058* (2013.01); *B01J 20/20* (2013.01); *B01J 20/3204* (2013.01); *B01J 20/3234* (2013.01); *B01J 20/3248* (2013.01); *B01D 2239/0442* (2013.01); *B01D 2239/0464* (2013.01); *B01D 2239/10* (2013.01)

(58) Field of Classification Search
CPC ....... A62B 23/02; A62B 23/00; A62B 23/025; A62B 23/04; A62B 23/06; B01D 2239/0442; B01D 2239/0464; B01D 2239/10; B01D 39/02; B01D 39/2058; B01J 20/20; B01J 20/3204; B01J 20/3234; B01J 20/3248
USPC ..................................... 604/205.27
See application file for complete search history.

(56) References Cited

U.S. PATENT DOCUMENTS

| 4,801,311 | A | 1/1989 | Tolles | |
| 5,492,882 | A * | 2/1996 | Doughty | ............... A62B 23/00 128/205.27 |
| 2008/0182748 | A1 * | 7/2008 | Osborne | .................. A61L 9/01 502/415 |
| 2011/0005394 | A1 * | 1/2011 | Joriman | ............. B01D 39/2055 95/141 |
| 2014/0171304 | A1 * | 6/2014 | Herrera | .................. B01D 53/02 502/401 |

FOREIGN PATENT DOCUMENTS

| CN | 695 186 | 1/2006 |
| DE | 690 05 374 | 5/1994 |
| DE | 20 2011 106 028 | 8/2012 |

(Continued)

Primary Examiner — Jason E Flick
(74) Attorney, Agent, or Firm — Rankin, Hill & Clark LLP (57) ABSTRACT

A method for manufacturing an impregnated filter material includes preparing at least one impregnating solution comprising sulphate and phosphate; providing a filter material; and impregnating the filter material with at least one impregnating solution, at least once. In this manner, it is possible to manufacture an impregnated filter material for the removal of noxious substances and/or toxins, which includes sulphate and phosphate. The noxious substances and/or toxins can thereby be present in the form of gases and/or vapours.

17 Claims, 2 Drawing Sheets

(56) References Cited

FOREIGN PATENT DOCUMENTS

| | | |
|---|---|---|
| DE | 20 2014 101 137 | 12/2014 |
| EP | 0 405 404 | 1/1991 |
| EP | 0 450 414 | 10/1991 |
| WO | 93/10896 | 6/1993 |
| WO | 01/30491 | 5/2001 |

* cited by examiner

IMPREGNATED FILTER MATERIAL

BACKGROUND OF THE INVENTION

The invention relates to the field of air purification. It relates to an impregnated filter material, as well as to a method for manufacturing an impregnated filter material, according to the preamble of the respective, independent patent claims. The filter material according to the invention is particularly suitable for the adsorption of noxious substances and/or toxins, out of respiratory air, thus for the application for example in protective masks for personal protective equipment or in filters of ventilation facilities in the field of collective protection.

According to the state of the art, activated carbon or another suitable base material with a large surface area per unit of weight is applied, in order to create base materials for example for protective mask filters. For this purpose, the base material is usually impregnated with metals, for example in the form of metal oxides, carbonates or chlorides, and, as the case may be, with additional organic substances, by which means it obtains an increased, as the case may be, specific adsorption capacity, which at least partly is based on the metals catalysing chemical conversions of the noxious substances, or the chemisorption of the base material being changed or improved. Such an impregnated base material, in particular an activated carbon impregnated in such a manner, is suitable for the removal for example of noxious substances such as chlorine, hydrogen chloride, hydrogen cyanide, hydrogen sulphide, carbon tetrachloride, ammonia etc., from respiratory air.

Base materials based on activated carbon were used in protective mask filters during the Second World War, wherein the activated carbon was impregnated with copper, silver and chromium, and on account of this were particularly effective against hydrogen cyanide, cyanogenic compounds and arsenics. However, since chromium$^{+6}$ is less desirable for ecological reasons due to its carcinogenic characteristics and due to its water solubility, later and still up to this present day, one has attempted to replaced chromium$^{+6}$ in the impregnating means.

According to U.S. Pat. No. 4,801,311 (Westvaco Corp.), a vanadate or a molybdate is used for the impregnation of activated carbon instead of chromium, wherein the activated carbon additionally comprises triethylene diamine and, as the case may be tartaric acid. According to EP0450414 (Drägerwerk), a chromium-free activated carbon is manufactured by way of impregnating the activated carbon with copper and tin as well as tungstate or molybdate and, as the case may be, vanadate. According to EP0614400 (Calgon Carbon Corp.), a chromium-free activated carbon is manufactured by way of impregnating the activated carbon with copper or zinc as well as molybdate. According to the mentioned publications, the effect of the chromium-free activated carbons is just as good as those activated carbons which are impregnated with chromium, in particular concerning the adsorption of hydrogen cyanide and cyanogenic compounds, and concerning the storage capability.

SUMMARY OF THE INVENTION

It is therefore the object of the invention, to provide a chromium-free filter material in the field of respiratory air processing for protective masks, vehicle filters and collective filters, of all types, and a method for manufacturing a filter material as well as a filter and a protective mask, which are suitable for the adsorption of noxious substances and/or toxins out of the respiratory air, in particular noxious substances and/or toxins such as chlorine, hydrogen chloride, hydrogen cyanide, cyanogenic chloride, hydrogen sulphide, sulphur dioxide, formaldehyde, ammonia, mercaptans, bromine, hydrogen fluoride, hydrogen bromide, methylamine, other amines, phosgene, phosphorus trichloride, phosphine, nitrogen dioxide, sarin, arsenic, chloropicrin, dimethyl methyl phosphonate (DMMP), mercury vapours and/or organic vapours such as cyclohexane and/or tetrachlorocarbon.

The filter material according to the invention should meet all common quality demands and in particular, compared to known filter materials with chromium, should have an at least equally good adsorption spectrum with respect to noxious substances and/or toxins, and an at least equally good ageing behaviour.

This object is achieved by a method for manufacturing an impregnated filter material and an impregnated filter material, with the features of the respective independent patent claims.

The method for manufacturing an impregnated filter material comprises the following steps:
  providing at least one impregnating solution comprising sulphate and phosphate;
  providing a filter material;
  impregnating the filter material with at least one impregnating solution, at least once.

In this manner, it is possible to manufacture an impregnated filter material for the removal of noxious substances and/or toxins from respiratory air, said filter material comprising sulphate and phosphate. The noxious substances and/or toxins can thereby be present in the form of gases and/or vapours.

On impregnation, the filter material is soaked in the impregnating solution or the filter material is wetted by the impregnating solution.

The impregnation charging can be increased or set by way of a repeated impregnation, and a uniform charging of the filter material can be achieved. It is also possible for different impregnating solutions to be used for the various impregnating steps. Different or the same impregnating solutions can be deposited in several impregnating steps on account of this. It is possible to impregnate once, twice, thrice, four times or several times.

The impregnating solution can be an aqueous impregnating solution.

The impregnating solution and/or the impregnating solutions in the case of several impregnating steps can comprise at least the following impregnating components: phosphate, sulphate, molybdenum, zinc and copper.

The method for manufacturing the impregnated filter material can comprise the following steps:
  providing a zinc chloride solution, in particular an aqueous zinc chloride solution;
  impregnating the filter material with the zinc chloride solution.

The durability of the filter material, in particular of the moist filter material can be improved by way of this.

The filter material can be dried after one and/or each impregnation. The drying can be effected by way of heating the filter material. Thereby, the temperature on drying should not rise to the ignition temperature of the dried filter material, in particular of the dried activated carbon. The filter material can be effectively dried by way of this. A conversion of the impregnating chemicals on the filter material can occur on drying.

The filter material can be a porous material. Different compounds which form the impregnation can be accumulated on the surface of the porous filter material. The impregnated, porous filter material can absorb the noxious substances and/or toxins, wherein the impregnation improves the capacity or the holding time with regard to various gases and/or vapours (in comparison to non-impregnated filter material). The filter material can be an activated carbon (active carbon), in particular an activated carbon manufactured from coconut husks. The activated carbon can be activated by way of treatment in a rotary kiln or with water vapour in the fluidised bed method. Activated carbon is a porous carbon with a large inner surface area which is suitable for the absorption of the noxious substances and/or toxins. The filter material can be designed as water-activated activated carbon. The filter material can also be designed as activated shaped carbon.

The impregnating solution can comprise molybdenum and/or zinc and/or copper.

At least one impregnating solution can comprise at least one, in particular at least three of the following impregnating chemicals:
- sulphuric acid
- phosphoric acid
- water
- copper salt, in particular copper carbonate, copper hydroxide, copper nitrate;
- zinc salt, in particular zinc carbonate, zinc hydroxide;
- aqueous ammonia solution (ammonia);
- triethylene diamine (TEDA):
- silver salt, such as for example silver nitrate;
- ammonium salt, in particular ammonium carbonate, ammonium sulphate and/or ammonium phosphate;
- halogenate, in particular iodate, bromate and/or chlorate, in particular potassium iodate, sodium iodate, potassium bromate, sodium bromate, potassium chlorate, sodium chlorate;
- molybdenum salt, in particular ammonium heptamolybdate;
- sulphate, in particular ammonium sulphate; and/or
- phosphate, in particular ammonium phosphate.

The impregnating solution can comprise at least three of the following impregnating chemicals: water, ammonia, nitrate, in particular silver nitrate, copper salt, in particular copper carbonate, ammonium carbonate, molybdenum salt, in particular ammonium heptamolybdate, halogenate, in particular iodate, in particular potassium iodate, zinc salt, in particular zinc hydroxide, sulphate, in particular ammonium sulphate, phosphate, in particular ammonium phosphate, and/or triethylene diamine (TEDA).

Ammonia serves as a solvent for metal compounds in the impregnating solution. The filter material, on impregnation, is already impregnated with ammonia on account of this. Ammonia is dispelled during the drying of the filter material, wherein up to 0.4% ammonia remains bonded on the filter material. The bonded ammonia can be present on the filter material in the form of ammonium carbonate and/or ammonium molybdate. The bonded ammonia can desorb as ammonia due to heat and/or air humidity, during the usage of the filter material, for example in a protective mask, vehicle filter and/or collective filter.

The impregnated filter material comprises sulphate and phosphate for the removal of noxious substances and/or toxins from the respiratory air. Surprisingly, it could be found that the desorption of ammonia can be minimised or reduced with the help of such an impregnated filter material. The ammonia largely remains bonded on the filter material after impregnation of the filter material. During a use of the filter material, the ammonia workplace concentration values of 14 mg/m$^3$ in accordance with TRGS 900 of Sep. 11, 2015 can be complied with, on account of this.

The filter material can comprise zinc and/or molybdenum, in particular zinc sulphate and/or zinc phosphate. Such a filter material can prevent or reduce a desorption of ammonia on use of the filter material.

The filter material can be chromium-free, nickel-free, vanadium-free and/or cobalt-free. The occurrence of carcinogenic and/or toxic compounds on the filter material can be reduced by in this manner.

The impregnated filter material can comprise molybdenum, copper and zinc.

As already described, the filter material is manufacturable by way of the described method.

The filter material can comprise zinc sulphate, in particular 1-25% by weight of zinc sulphate, in particular 1-15% by weight of zinc sulphate, in particular 1-12% by weight of zinc sulphate, zinc phosphate, in particular 0.5-3.5% by weight of zinc phosphate, molybdate, in particular 0.5-5% by weight of ammonium heptamolybdate, zinc hydroxide, in particular 1-15% by weight of zinc hydroxide, and/or zinc carbonate, in particular 1-15% by weight of zinc carbonate.

The filter material can moreover comprise silver, in particular 0.02-2% by weight of silver oxide, triethylene diamine (TEDA), in particular 0.1-2% by weight of TEDA, halogenate, in particular iodate, bromate and/or chlorate, in particular 0.5-4% by weight of halogenate, in particular 0.5-4% by weight of potassium iodate, in particular 0.5-2% by weight of potassium iodate, and/or copper, in particular 0.5-10% by weight of copper oxide, in particular 0.5-6% by weight of copper oxide.

% by weight relates to the total mass of the filter material and is a mass share of the specific component, with regard to the total mass.

A filter or respiratory air filter for removing noxious substances and/or toxins from respiratory air can comprise such a filter material according to the invention. Such a filter can be applied in many fields in industry, and also for military purposes (ABC protection filter).

A respiratory protective mask and/or respiratory air protection device can comprise such a filter. The filter material can thereby be arranged in a cartridge of the respiratory protective mask and/or the respiratory air protection device.

The respiratory protective mask, the respiratory air protective device, the filter material or the filter can be applied for protection from noxious substances and/or toxins such as chlorine, hydrogen chloride, hydrogen cyanide, cyanogenic chloride, sulphur dioxide, hydrogen sulphide, formaldehyde, ammonia, mercaptans, bromine, hydrogen fluoride, hydrogen bromide, methylamine, other amines, arsenic, phosphorous trichloride, phosphine, nitrous oxides, phosgene, sarin, chloropicrin, dimethyl methyl phosphonate (DMMP), mercury vapours and/or organic vapours such as cyclohexane and/or tetrachlorocarbon and/or other noxious substances and/or toxins.

Further preferred embodiments are to be deduced from the dependent patent claims. Thereby, the features of the method claims with regard to context can be combined with the device claims and vice versa.

According to an embodiment, the filter material which is designed as activated carbon, comprises the following compounds:

| | |
|---|---|
| zinc sulphate ($ZnSO_4$) | 1-25% by weight |
| zinc phosphate ($Zn_3(PO_4)_2$) | 0.5-3.5% by weight |
| ammonium heptamolybdate $((NH_4)_6Mo_7O_{24} \times 4H_2O)$ | 0.5-5% by weight |
| copper oxide (CuO) | 0.5-8% by weight |
| zinc carbonate ($ZnCO_3$) | 1-15% by weight |
| zinc hydroxide (ZnOH) | 1-15% by weight |
| silver oxide ($Ag_2O$) | 0.02-2% by weight |

-continued

| | |
|---|---|
| potassium iodate (KIO₃) | 1-4% by weight |
| triethylene diamine (TEDA) | 0.1-2% by weight |

Such a filter material conforms to purely military standards as well as industrial standards. The impregnated filter material can also meet combinations of (military) ABC and industrial standards, with the help of modification of the impregnating solution and/or the impregnating chemicals.

A conversion of compounds on the filter material can occur when drying the impregnated filter material at high temperatures. For example, zinc hydroxide can be converted into zinc oxide at temperatures above 400° C.

BRIEF DESCRIPTION OF THE DRAWINGS

The subject-matter of the invention is explained in more detail by way of preferred embodiment examples which are represented in the accompanying drawings. In each case shown schematically are.

DETAILED DESCRIPTION OF THE INVENTION

Basically, the same parts are provided with the same reference numerals in the figures.

The following results could be achieved in various tests, in a performance comparison of products of the company Dr.P.Pleisch AG which have been obtainable on the market for some time now, specifically of the chromium-containing activated carbon PLW K and of the chromium-free activated carbon PL MC M (similar to that described in EP 1877338), with the product according to the invention, also characterised as PL MC C_CBRN.

Favourable ClCN Conversion by Way of Phosphates

An important warfare agent is cyanogenic chloride (ClCN) which must be adsorbed by the filter material. Long holding (withstanding) times counter to this warfare agent are demanded in most ABC protective filter specifications. As is evident from Table 1, it is indeed the phosphate which helps to prevent or minimise the ageing of the active carbon with regard to cyanogenic chloride. Two PL MC C_CBRN impregnated filter materials according to the invention and with variable impregnations (see Table 1) were used for the ageing test with regard to cyanogenic chloride, under the following test conditions:

Pre-Conditioning of the Sample:

Before the test, the impregnated filter material is pre-moistened in a testing tube with an airflow of 5.9 cm/s, 80%±2% relative humidity and 22±1° C., until equilibrium. The activated carbon is thereafter stored in the open testing tube for 7 days at 46° C. The activated carbon is again pre-moistened with an airflow of 5.9 cm/s, 80%±2% relative humidity and 22±1° C. until equilibrium, and tested.

Test Conditions of the Cyanogenic Chloride Test:

A 20 mm activated carbon bed is filled into a testing tube of 50 mm diameter by way of snow-storm filling. The cyanogenic chloride test concentration lies at 4000 mg/m³ in an airflow of 6.95 L/min (linear speed 5.9 cm/s). The relative humidity of the airflow is 80±2% and the air temperature is 24±3° C. The testing was continued until the breakthrough of 2.5 mg/m3 is reached.

The presence of phosphates on the impregnated filter material favours the conversion of cyanogenic chloride on moistened filter material after a thermo-loading or with long service lives >100 days. The impregnated filter material undergoes a reduced ageing against cyanogenic chloride. ABC protective filters as are applied e.g. in Israel for the protection of the population can be applied and manufactured more effectively and efficiently by way of this.

TABLE 1

Ageing with regard to cyanide, of the PL MC C:CBRN, with a different composition.

| activated carbon type | theoretical content [%] | | | | | | | ClCN$_{aged}$ holding time [min] |
|---|---|---|---|---|---|---|---|---|
| | Zn [%] | Cu [%] | Mo [%] | KIO₃ [%] | Zn [%] | SO₄²⁻ [%] | PO₄³⁻ [%] | |
| PL MC C_CBRN 1 | 8.3 | >0.5 | >0.5 | 2.1 | 1.5 | 1.3 | 0.4 | 31 |
| PL MC C_CBRN 2 | 8.3 | >0.5 | >0.5 | 2.1 | 1.5 | 1.3 | 0.6 | 42 |

Comparative Results

In contrast to the filter material type PL MC C, the impregnated filter material PL MC C_CBRN according to the invention has the same or similar characteristics to the chromium-containing type PLW K. Various test results for various test conditions are compared hereinafter.

ABC Protective Filter Testing Standard

Pre-conditioning of the sample "initial" and "aged":

Before the test, 160±2 mL of filter material is moistened in a testing tube of 100 mm diameter with an airflow of 30 L/min, 80%±2% relative humidity and 23±1° C. for 48 h. The impregnated filter material is subsequently used for the "initial" test. In contrast to this, for the "aged" test, the impregnated filter material is additionally stored in a closed testing tube for 96 h at 50° C. and subsequently used for the "aged" test.

Test Conditions:

The pre-conditioned, impregnated filter material is now individually tested against cyanogenic chloride, hydrocyanic acid and chloropicrin. The test concentrations of the individual test substances lie at 2000 mg/m³ test air. The test airflow lies at 30 L/min (contact time 0.32 s). The relative humidity of the airflow is 80%±2% and the air temperature is 23±1° C. The test was carried out until the breakthrough of 5 mg/m³ is reached. The respective results are summarised in Table 2.

TABLE 2

Holding times of PLW K, PL MC C and PL MC C_CBRN for different ABC protective filter test substances in an initial test and ageing test.

| test gas | PLW K | PL MC C | PL MC C_CBRN | requirement in min |
|---|---|---|---|---|
| chloropicrin holding time initial | 96 min | 18.8 min | 77.3 min | 60 |
| chloropicrin holding time aged | 91 min | n.b. | 70.7 min | 50 |
| cyanogenic chloride holding time initial | 115 min | 29 min | 95 min | 60 |
| cyanogenic chloride holding time aged | 75 min | 43 min | 66.3 min | 40 |
| hydrocyanic acid holding time initial | 82.3*/100** min | 51** min (no di-cyanide) | 59*/62.3** min | 50*/50** |
| hydrocyanic acid holding time aged | 48.7*/>56** min | 50** min (no di-cyanide) | 44.7*/45.7** min | 35*/35** |

*di-cyanide breakthrough
**hydrocyanic acid breakthrough

As is evident from Table 2, the product PL MC C (chromium-free filter material) does not meet the requirements. However, the impregnated filter material according to the invention meets the requirements.

ABC Protective Filter Test Standard Combined with the Standard for Industrial Filters (EN14387)

For a filter which until now has been filled with a chromium-containing activated carbon (PLW K), a chromium-free activated carbon must developed and should replace the chromium-containing filter material. Thereby, the filter should meet the demands of the ABC protective filter standard and EN14387 Class 2. EN14387 is a European standard for the testing of industrial person protective filter materials. Only the impregnation described hereinafter can be used for such a filter material: additionally zinc chloride ($ZnCl_2$) moistened in the region of 8-12% (W/W) with water, until the water content lies between 8-12%, as is represented in Table 3. Three filter materials are compared with one another hereinafter.

TABLE 3

Additional impregnating components for different impregnated filter materials.

| filter material | zinc chloride content [%] | water content [%] |
|---|---|---|
| PLW K-$ZnCl_2$ | 8.5 | 10.0 |
| PL MC C_CBRN-$ZnCl_2$ | 8.5 | 10.0 |
| PL MC C-$ZnCl_2$ | 8.5 | 10.0 |

Testing according to ABC protective filter test standard carried out as follows:

Pre-Conditioning of the Sample "Initial":

Before the test, 400±5 mL of the impregnated filter material is moistened in a testing tube of 100 mm diameter with an airflow of 30 L/min, 90%±2% relative humidity and 18±1° C. for 48 hours. The activated carbon is subsequently used for the "initial" test. In contrast to this, for the "aged" test, the impregnated filter material was additionally stored in a closed testing tube for 96 hours at 50° C. and subsequently used for the "aged" test.

Test Conditions:

The pre-conditioned, impregnated filter material, similarly as with the filter material free of zinc chloride described above, is now individually tested against cyanogenic chloride, hydrocyanic acid and chloropicrin. The test concentrations of the individual test substances lie at 2000 mg/m³ test air. The test airflow lies at 30 L/min (contact time 0.8 s). The relative humidity of the airflow is 90%±1% and the air temperature is 18±1° C. The test is continued until the breakthrough of 5 mg/m³ is reached.

As is evident from Table 4, the filter material PL MC C_CBRN—$ZnCl_2$ has a reduced ageing with regard to HCN, as the initial chromium-containing filter material PLW K—ZnCl2.

TABLE 4

Holding times of PLW K-$ZnCl_2$, and PL MC C_CBRN-$ZnCl_2$ for different ABC protective filter test substances in an "initial" test and an ageing test.

| test gas | PLW K-$ZnCl_2$ | PL MC C_CBRN-$ZnCl_2$ | requirement in min |
|---|---|---|---|
| chloropicrin holding time initial | >120 min | 220 min | 60 |
| chloropicrin holding time aged | >120 min | 245 min | 50 |
| cyanogenic chloride holding time initial | >120 min | 217 min | 60 |
| cyanogenic chloride holding time aged | >120 min | 152 min | 40 |
| hydrocyanic acid holding time initial | >120*/>120** min | 132*/148** min | 60*/60** |

TABLE 4-continued

Holding times of PLW K-ZnCl$_2$, and PL MC C_CBRN-ZnCl$_2$ for different ABC protective filter test substances in an "initial" test and an ageing test.

| test gas | PLW K-ZnCl$_2$ | PL MC C_CBRN-ZnCl$_2$ | requirement in min |
|---|---|---|---|
| hydrocyanic acid holding time aged | 83*/131** min | 110*/145** min | 50*/50** |

*di-cyanide breakthrough
**hydrocyanic acid breakthrough

Test According to EN14387

Filter materials of the type PL MC C which are impregnated with zinc chloride and have been moistened to a water content of 8-12% (W/W), with test substances such as SO$_2$ and H$_2$S have a significant ageing after a thermo-loading. For this reason, the two chromium-free types PL MC C and PL MC C_CBRN are compared amongst one another. The samples are conditioned as follows, in order to simulate the ageing.

Pre-Conditioning of the Sample "Aged"

1000 mL of impregnated filter materials are added into a glass vessel and thereafter closed and stored for 10 days at 100° C., before the test. The filter material is subsequently cooled to room temperature and used for the "aged" test.

Test Conditions:

The pre-conditioned filter materials are filled into a testing tube having 60 mm diameter by way of snow-storm filling. The activated carbon layer is 32 mm. The elaborated, pre-conditioned filter materials are now tested individually against SO$_2$ and H$_2$S. The test concentrations of the individual test substances in the testing air lie at 5000 ppm. The testing air flow lies at 9.8 L/min (contact time 0.56 s). The relative humidity of the air flow is 70%±5% and the air temperature is 21±4° C. The test was continued until the breakthrough of 5 ppm for SO$_2$ or 10 ppm for H$_2$S is reached.

As is evident from the Table 5, the impregnated filter material PL MC C_CBRN —ZnCl2 has a reduced ageing, as is the case with chromium-free activated carbon PL MC C —ZnCl2. Hence an improvement with regard to the state of the art could also be achieved here.

TABLE 5

Holding times of PL MC C_CBRN-ZnCl$_2$ and PL MC C-ZnCl$_2$ for SO$_2$ and H$_2$S.

| activated carbon type | SO$_2$ holding time after ageing [%] | H$_2$S holding time after ageing [%] |
|---|---|---|
| PL MC C_CBRN-ZnCl$_2$ | 93 | 82.9 |
| PL MC C-ZnCl$_2$ | 78.9 | 57.1 |

Swiss Specification for ABC Protective filter TPH-07

The filter material from the state of the art PL MC C has very good gas holding times at high contact times and high test concentrations. The new filter material according to the invention can also be applied with high contact times. The respective results are summarised in Table 6.

Preconditioning of the Sample (F) and (FAN):

152–0/+2 mm of impregnated filter material is moistened in a testing tube of 60 mm diameter with an airflow of 16.3±1.63 L/min, 90%–0/+5% relative humidity and 20±0.5° C. for 60 hours before the testing. The activated carbon is subsequently used for the (F)-test. In contrast to this, the impregnated material was additionally stored in the closed testing tube for 100 days at 20° C. and subsequently used for the (FAN)-test

TABLE 6

Holding times of PLW K, PL MC C and PL MC C_CBRN for different ABC protective filter test substances in an (F)-test and a (FAN) test.

| test gas | PLW K | PL MC C | PL MC C_CBRN | requirement |
|---|---|---|---|---|
| chloropicrin holding time (F) | >160 min | >170 min | *215 min | >50 min |
| chloropicrin holding time (FAN) | >140 min | >190 min | 67 min | >50 min |
| cyanogenic chloride holding time (F) | >180 min | >180 min | *220 min | >80 min |
| cyanogenic chloride holding time (FAN) | >140 min | >180 min | 203 min | >80 min |
| hydrocyanic acid holding time (F) | >120*/>120** min | >120** min | 113*/>113** min | >80*/>80** min |
| hydrocyanic acid holding time (FAN) | >80*/>80** min | >110** min | 87*/>87** min | >80*/>80** min |

*di-cyanide breakthrough
**hydrocyanic acid breakthrough

Test Conditions:

The conditioned filter materials (activated carbons) are now tested individually against cyanogenic chloride, hydrocyanic acid and chloropicrin. The test concentrations of hydrocyanic acid and cyanogenic chloride lie at 5 g/m$^3$ test air and the test concentration of chloropicrin lies at 16 g/m$^3$. The test airflow lies at 16.3±1.63 L/min (contact time 1.58 s). The relative humidity of the airflow is 80%±2% and the air temperature is 23±1° C. The testing was continued until a breakthrough of 5 mg/m$^3$ is reached.

Gas Holding Times Against Phosphine and Nitrogen Dioxide (NIOSH-CBRN Conditions)

The filter materials were tested as delivered. The filter materials are therefore not specifically pre-conditioned.

Test Conditions

The impregnated filter material is filled into a testing tube with a 60 mm diameter by way of snow-storm filling. The testing layer height is 32±1 mm. The impregnated filter material is tested against phosphine and nitrogen dioxide. The test concentrations of the individual test substances, for phosphine lies at 300 ppm and for nitrogen dioxide at 200 ppm. The test airflow lies at 20.9±1.5 L/min (contact time 0.26 s). The relative humidity of the air flow is 25%±5% and the air temperature is 20±5° C. The test was carried out until the breakthrough of 0.3 ppm with phosphine and 25 ppm with nitrogen monoxide or 1 ppm nitrogen dioxide (nitrogen dioxide is converted on the activated carbon into nitrogen monoxide.) The respective test results are summarised in Table 7.

TABLE 7

Breakthrough times of phosphine and nitrogen dioxide for PLW K, PL MC C and PL MC C_CBRN.

| test gas | PLW K | PL MC C | PL MC C_CBRN | requirement |
| --- | --- | --- | --- | --- |
| phosphine | >47.4 min | 5.1 min | >40.5 min | min. 15 min |
| nitrogen dioxide | 25.4 min | 5.0 min | 18.4 min | min. 15 min |

Since chromium-containing filter materials are forbidden in the USA for example, and the chromium-free filter material PL MC C does not meet the standards, only the impregnated filter material according to the invention can be applied.

Gas Holding Times Against Chlorine Gas

The filter materials were tested as delivered, also for this test. The filter materials are therefore not specifically preconditioned.

Test Conditions:

The activated carbons are filled into a testing tube with a 60 mm diameter by way of snow-storm filling. The test layer height is 32±1 mm. The activated carbons are tested against chlorine. The test concentration lies at 1000 ppm. The test airflow lies at 9.8±0.5 L/min (contact time 0.554 s). The relative humidity of the airflow is 70%±5% and the air temperature is 20±5° C. The test is continued until the breakthrough of 0.5 ppm of chlorine or 1.0 ppm of formaldehyde. (Chlorine reacts with TEDA (tetraethylene diamine) on the filter material into noxious formaldehyde). The respective test results are summarised in Table 8.

TABLE 8

Breakthrough times of chlorine for PLW K, PL MC C and PL MC C_CBRN.

| test gas | PLW K | PL MC C | PL MC C_CBRN |
| --- | --- | --- | --- |
| chlorine | **>90 min | *<10 min | *>40 min |

*di-cyanide breakthrough
**hydrocyanic acid breakthrough

Filter materials which are impregnated with TEDA and correspond to the type PL MC C have only just ¼ and less of the chlorine gas performance, in comparison to the impregnated filter materials according to the invention. Chlorine gas holding times which are as long as possible however are very important, since chlorine gas is indeed often used as a warfare gas.

NH3 Desorption (According to Swiss Standard for ABC Protective Filter Standard TPH-07)

For this test too, the filter materials are tested as delivered. The filter materials are therefore not specifically pre-conditioned.

Figure 1:
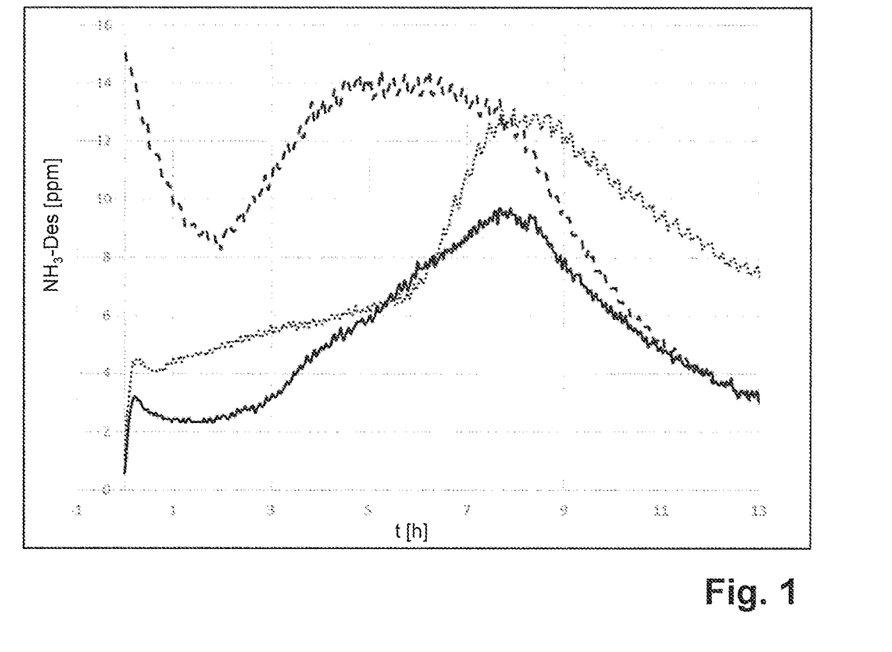
FIG. 1 NH₃ desorption according to Swiss specifications for ABC protective filters TPH-07 for filter material with a mesh size of 14×30.

Test Conditions for 14×30 Mesh Size:

The impregnated filter material with the grain size of 14×30 mesh size is filled into a testing tube with a 60 mm diameter by way of snow-storm filling. The test layer height is 152±1 mm. The samples are then subjected to a test airflow of 14.4±0.5 L/min (contact time 0.424 s). The test air humidity is 90–0/+5% and the test air temperature 20±5° C. The air exiting after the testing tube is tested for ammonia. With the leached-out ammonia, it is the case of the so-called residual ammonia which was not completely expelled from the activated carbon during the drying process. The test was continued until the maximum of the NH3 desorption is achieved or exceeded. The respective test results are shown in FIG. 1. Thereby, the data for PL MC C_CBRN are represented as a solid line, for PL MC C as a dashed line and for PLW K as a dotted line. It is evident from FIG. 1, that PL MC C_CBRN has the lowest ammonia desorption (NH3-des).

Figure 2:
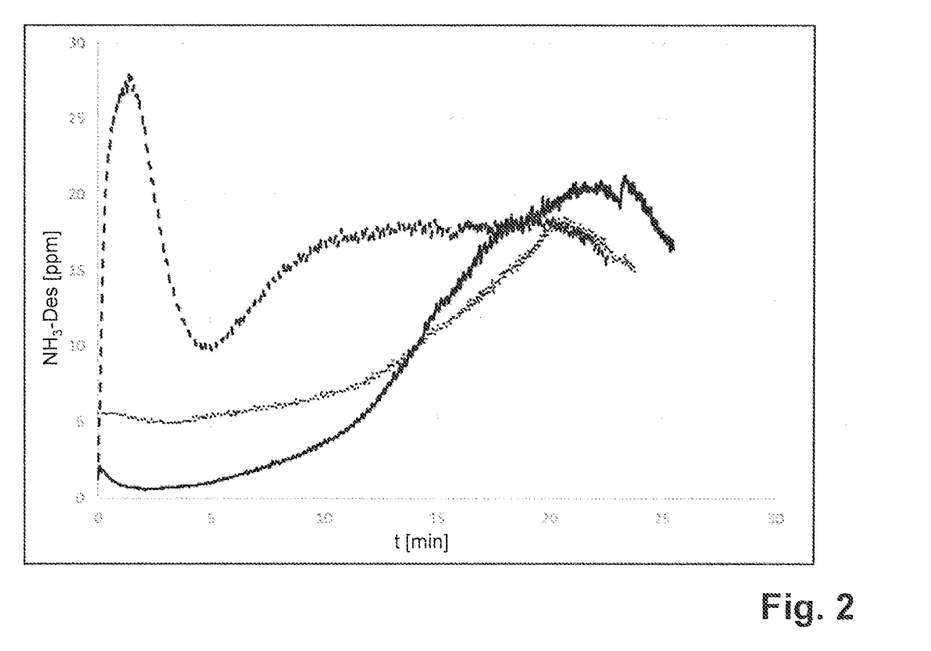
FIG. 2 NH₃ desorption according to Swiss specifications for ABC protective filters TPH-07 for filter material with a mesh size of 7×16.

Test Conditions for 7×16 Mesh Size:

The impregnated filter material with the grain size of 7×16 mesh size is filled into a testing tube having a 60 mm diameter by way of snow-storm filling. The test layer height is 152±1 mm. The samples are then subjected to throughflow with a test airflow of 16.3±0.5 L/min (contact time 1.58 s). The test air humidity is 90%–0/+5% and the test air temperature is 20±2° C. The air which has exited after the testing tube is tested for ammonia (NH3). The ammonia which was leached out of the activated carbon with this test is present in a bonded form after manufacture of the activated carbon. The test was carried out until the maximum of the NH3 desorption is reached or exceeded. The respective test results are represented in FIG. 2. Thereby, the data for PL MC C_CBRN are represented as a solid line, for PL MC C as a dashed line and for PLW K as a dotted line. It is evident from FIG. 2 that PL MC C_CBRN has a similarly large or high ammonia desorption (NH3-Des) as PLW K and PL MC C.

Figure 3A:
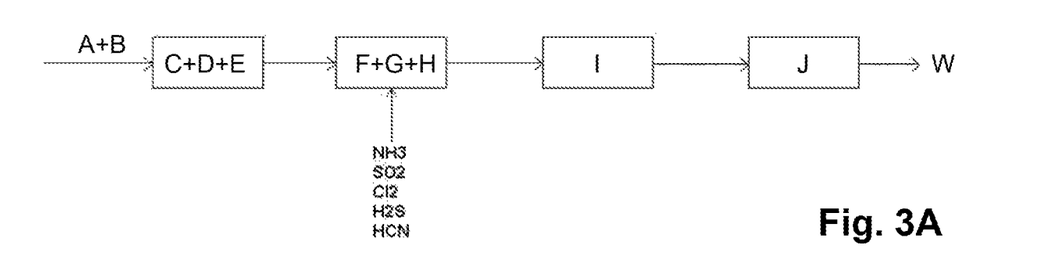
FIG. 3A flow diagram of a test apparatus for testing filter material.
Figure 3B:
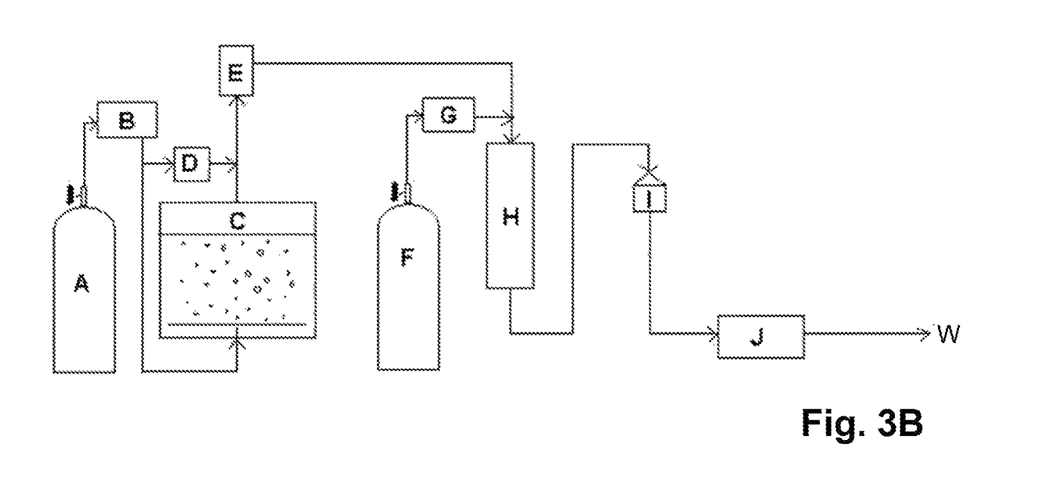
FIG. 3B schematic construction of a test apparatus for testing filter material.

FIGS. 3A and 3B show a test apparatus for the testing of impregnated filter material, as described beforehand. FIG. 3A thereby shows a flow diagram and FIG. 3B the schematic construction. On testing, compressed, dry air (A) is closed-loop controlled with a mass-flow controller (B) for setting the test volume flow. This is led through a temperature-controllable water bath (C) for processing the relative humidity and a controller (D) is configured for setting the desired relative humidity. A measuring appliance (E) serves for determining the relative humidity. A gas bottle (F) with the agent to be tested (for example NH3, PH3, NO2 or Cl2) is connected to a mass-flow controller (G) for setting the desired target concentration. A mixing chamber (H) is provided, in order to mix the agent with the processed air. The filter material to be tested is arranged in the testing tube (I), and a gas detector (J) serves for measuring the gas breakthrough.

The invention claimed is:

1. A method for manufacturing an impregnated filter material, wherein the method comprises the following steps:
    providing at least one impregnating solution comprising sulphate and phosphate;
    providing a filter material; and
    impregnating the filter material with at least one impregnating solution, at least once;
    wherein the filter material is an activated carbon manufactured from coconut husks.

2. The method according to claim 1, wherein at least one impregnating solution comprises molybdenum and/or copper and/or zinc.

3. The method according to claim 1, wherein the impregnating solution is an aqueous solution.

4. The method according to claim 1, wherein the method further comprises the step of:
    drying the filter material after an impregnation.

5. The method according to claim 1, wherein at least one impregnating solution comprises at least one of the following impregnating chemicals: sulphuric acid and phosphoric acid.

6. The method according to claim 1, wherein at least one impregnating solution comprises at least three of the following impregnating chemicals: water, ammonia, nitrate, copper salt, ammonium carbonate, molybdenum salt, halogenate, zinc salt, sulphate, phosphate, and/or triethylene diamine (TEDA).

7. The method according to claim 1, wherein the impregnating solution and/or the impregnating solutions comprise at least one of the following impregnating components: phosphate, sulphate, molybdenum, zinc and copper.

8. The method according to claim 1, wherein the method further comprises the steps of:
    providing a zinc chloride solution;
    impregnating the filter material with the zinc chloride solution.

9. The method according to claim 1, wherein the impregnated filter material produced by the method includes:
    1-12% by weight of zinc sulphate,
    0.5-3.5% by weight of zinc phosphate,
    0.5-5% by weight of ammonium heptamolybdate,
    one or both of a) 1-15% by weight of zinc hydroxide, and
        b) 1-15% by weight of zinc carbonate,
    0.02-2% by weight of silver oxide,
    0.1-2% by weight of TEDA,
    0.5-2% by weight of potassium iodate, and
    0.5-6% by weight of copper oxide.

10. An impregnated filter material for the removal of noxious substances and/or toxins out of respiratory air, wherein the impregnated filter material comprises sulphate and phosphate, and wherein the filter material is an activated carbon manufactured from coconut husks.

11. The filter material according to claim 10, wherein the impregnated filter material comprises molybdenum, copper and zinc.

12. The filter material according to claim 10, wherein the filter material is manufactured by a method including:
    providing at least one impregnating solution comprising sulphate and phosphate;
    providing a filter material of activated carbon manufactured from coconut husks; and
    impregnating the filter material with at least one impregnating solution, at least once.

13. The filter material according to claim 10, wherein the filter material comprises zinc sulphate, zinc phosphate, molybdate and/or zinc carbonate.

14. The filter material according to claim 10, wherein the filter material comprises silver, triethylene diamine (TEDA), halogenate and/or copper.

15. The filter material according to claim 10, wherein the filter material comprises:
    1-12% by weight of zinc sulphate,
    0.5-3.5% by weight of zinc phosphate,
    0.5-5% by weight of ammonium heptamolybdate,
    one or both of a) 1-15% by weight of zinc hydroxide, and
        b) 1-15% by weight of zinc carbonate,
    0.02-2% by weight of silver oxide,
    0.1-2% by weight of TEDA,
    0.5-2% by weight of potassium iodate, and
    0.5-6% by weight of copper oxide.

16. A filter for removing noxious substances and/or toxins from respiratory air, comprising a filter material according to claim 10.

17. A respiratory protective mask and/or respiratory air protective device comprising a filter according to claim 16.

* * * * *